US011680753B2

(12) United States Patent
Shuck et al.

(10) Patent No.: US 11,680,753 B2
(45) Date of Patent: Jun. 20, 2023

(54) FUSED FILAMENT FABRICATION OF HEAT PIPE

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 168 days.

(21) Appl. No.: 17/097,843

(22) Filed: Nov. 13, 2020

(65) Prior Publication Data
US 2021/0148645 A1    May 20, 2021

Related U.S. Application Data

(60) Provisional application No. 62/935,399, filed on Nov. 14, 2019.

(51) Int. Cl.
*F28D 15/04* (2006.01)
*B29C 64/118* (2017.01)
(Continued)

(52) U.S. Cl.
CPC ............. *F28D 15/046* (2013.01); *B22F 3/10* (2013.01); *B22F 10/00* (2021.01); *B29C 64/118* (2017.08);
(Continued)

(58) Field of Classification Search
CPC ...... F28D 15/046; F28D 15/0283; B22F 3/10; B22F 10/00; B22F 3/1109; B22F 3/1118;
(Continued)

(56) References Cited

U.S. PATENT DOCUMENTS 4,602,679 A * 7/1986 Edelstein ................ F24S 10/95
                                                      122/366
7,028,760 B2 * 4/2006 Dussinger ........... H01L 23/4006
                                                      165/104.21
(Continued)

FOREIGN PATENT DOCUMENTS

EP          3363563 A1      8/2018
EP         34707365 A1      4/2019
WO      2018067918 A2      4/2018

OTHER PUBLICATIONS

Hacopian et al., "Technical Challenges with 3D Printing Heat Shields," NASA Slideshow, Aug. 28, 2018, 11 pp.
(Continued)

*Primary Examiner* — Lawrence Averick
(74) *Attorney, Agent, or Firm* — Shumaker & Sieffert, P.A.

(57) ABSTRACT

In some examples, a method for additively manufacturing a heat pipe, the method including depositing, via a filament delivery device, a filament to form a heat pipe preform, wherein the filament includes a binder and a metal or alloy powder; and sintering the heat pipe preform to form the heat pipe, the heat pipe including an outer shell, a wicking region, and a vapor transport region defined by the metal or alloy.

10 Claims, 6 Drawing Sheets

(51) Int. Cl.
  *B33Y 10/00*   (2015.01)
  *B22F 3/10*    (2006.01)
  *F28D 15/02*   (2006.01)
  *B33Y 30/00*   (2015.01)
  *B33Y 80/00*   (2015.01)
  *B33Y 70/10*   (2020.01)
  *B22F 10/00*   (2021.01)

(52) U.S. Cl.
  CPC ............... *B33Y 10/00* (2014.12); *B33Y 30/00* (2014.12); *B33Y 70/10* (2020.01); *B33Y 80/00* (2014.12); *F28D 15/0283* (2013.01)

(58) Field of Classification Search
  CPC ........ B22F 5/106; B22F 7/06; B22F 2999/00; B22F 10/18; B29C 64/118; B33Y 10/00; B33Y 30/00; B33Y 70/10; B33Y 80/00; B33Y 40/20; Y02P 10/25; F28F 2255/18
  See application file for complete search history.

(56) References Cited

U.S. PATENT DOCUMENTS

| | | | |
|---|---|---|---|
| 9,815,118 | B1 | 11/2017 | Schmitt et al. |
| 10,562,226 | B1* | 2/2020 | Cohen .................. B33Y 10/00 |
| 10,857,730 | B1* | 12/2020 | Cohen ................ B29C 48/0022 |
| 11,014,162 | B2 | 5/2021 | Hofmann |
| 11,045,912 | B2* | 6/2021 | Alahyari ............. F28D 15/0233 |
| 11,122,706 | B2* | 9/2021 | Jeffers .................. F28D 15/046 |
| 11,529,685 | B2 | 12/2022 | Kritchman et al. |
| 2005/0145374 | A1* | 7/2005 | Dussinger ................. B22F 3/11 257/E23.088 |
| 2014/0008374 | A1 | 1/2014 | Lubart et al. |
| 2015/0064047 | A1* | 3/2015 | Hyde ..................... B22F 10/50 164/113 |
| 2015/0080495 | A1 | 3/2015 | Heikkila |
| 2016/0177829 | A1 | 6/2016 | Loebig et al. |
| 2016/0214176 | A1 | 7/2016 | Bruck et al. |
| 2017/0102194 | A1 | 4/2017 | Choi et al. |
| 2018/0172369 | A1 | 6/2018 | Rhoden et al. |
| 2018/0281283 | A1 | 10/2018 | Frechman et al. |
| 2018/0339342 | A1 | 11/2018 | Hofmann |
| 2019/0077715 | A1 | 3/2019 | Alessi et al. |
| 2019/0110357 | A1* | 4/2019 | Gavagnin ............... H05K 1/021 |
| 2019/0178585 | A1 | 6/2019 | de Bock et al. |
| 2019/0217525 | A1 | 6/2019 | Mark et al. |
| 2019/0387643 | A1* | 12/2019 | Jeffers ..................... F28D 15/02 |
| 2020/0047252 | A1 | 2/2020 | Kritchman et al. |
| 2020/0248014 | A1* | 8/2020 | Bougher .................. C08K 3/04 |
| 2020/0316684 | A1 | 10/2020 | Shuck |
| 2020/0398385 | A1* | 12/2020 | Alahyari ................. B23P 15/26 |
| 2021/0307202 | A1* | 9/2021 | Abate ..................... B22F 10/38 |

OTHER PUBLICATIONS

Mulholland et al., "Design and Additive Manufacturing of a Composite Crossflow Heat Exchanger," Solid Freeform Fabrication 2017: Proceedings of the 28th Annual International Solid Freeform Fabrication Symposium, Aug. 2017, 9 pp.

Ameli et al., "Advanced 3D Printed Heat Pipes, for space applications," Heat Exchanger Action Group (HEXAG) meeting, Thermacore Europe, May 22, 2013, 37 pp.

"Standard Heat Pipes," Retrieved from https://myheatsinks.com/heat-pipe-solutions/standard-heat-pipes/ on Oct. 24, 2019, 6 pp.

Jafari et al., "Metal 3D-Printed Wick Structures for Heat Pipe Application: Capillary Performance Analysis," Applied Thermal Engineering, vol. 143, Jul. 22, 2018, pp. 403-414.

Norfolk et al., "3D Printing Dissimilar Metals Improves Thermal Performance," fabrisonic.com, Sep. 5, 2018, 4 pp.

Mulholland et al., "Filled Thermoconductive Plastics for Fused Filament Fabrication," Solid Freeform Fabrication 2016: Proceedings of the 27th Annual International Solid Freeform Fabrication Symposium, Aug. 2016, 14 pp.

Iftikhar, "Fabrisonic's 3D Metal Printed Heat Exchanger Gets Green-Light From NASA," 3dprintingindustry.com, Aug. 13, 2018, 4 pp.

U.S. Appl. No. 17/098,019, filed Nov. 13, 2020, by Shuck et al.
U.S. Appl. No. 17/097,924, filed Nov. 13, 2020, by Shuck et al.

* cited by examiner

US 11,680,753 B2

FUSED FILAMENT FABRICATION OF HEAT PIPE

This application claims the benefit of U.S. Provisional Patent Application No. 62/935,399, titled, "FUSED FILAMENT FABRICATION OF HEAT PIPE", filed Nov. 14, 2019, which is incorporated herein by reference in its entirety.

TECHNICAL FIELD

The disclosure relates to additive manufacturing techniques including, e.g., to additive manufacturing of metal or alloy components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing heat pipes using fused filament fabrication.

In some examples, the disclosure describes a method for additively manufacturing a heat pipe, the method comprising depositing, via a filament delivery device, a filament to form a heat pipe preform, wherein the filament includes a sacrificial binder and a metal or alloy powder; and sintering the heat pipe preform to form the heat pipe, the heat pipe including an outer shell, a wicking region, and a vapor transport region defined by the metal or alloy.

In some examples, the disclosure describes an additively manufactured a heat pipe comprising an outer shell, a wicking region, and a vapor transport region defined by a metal or alloy derived from fused filament fabrication process.

In some examples, the disclosure describes an additive manufacturing system comprising a substrate defining a major surface; a filament delivery device; and a computing device configured to control a filament delivery device to deposit a filament to form a pre-sintered heat pipe preform, wherein the filament includes a binder and a metal or alloy powder, and wherein the pre-sintered heat pipe preform is configured to be sintered to form the heat pipe, the heat pipe including an outer shell, a wicking region, and a vapor transport region defined by the metal or alloy.

The details of one or more examples are set forth in the accompanying drawings and the description below. Other features, objects, and advantages will be apparent from the description and drawings, and from the claims.

DETAILED DESCRIPTION

Figure 1:
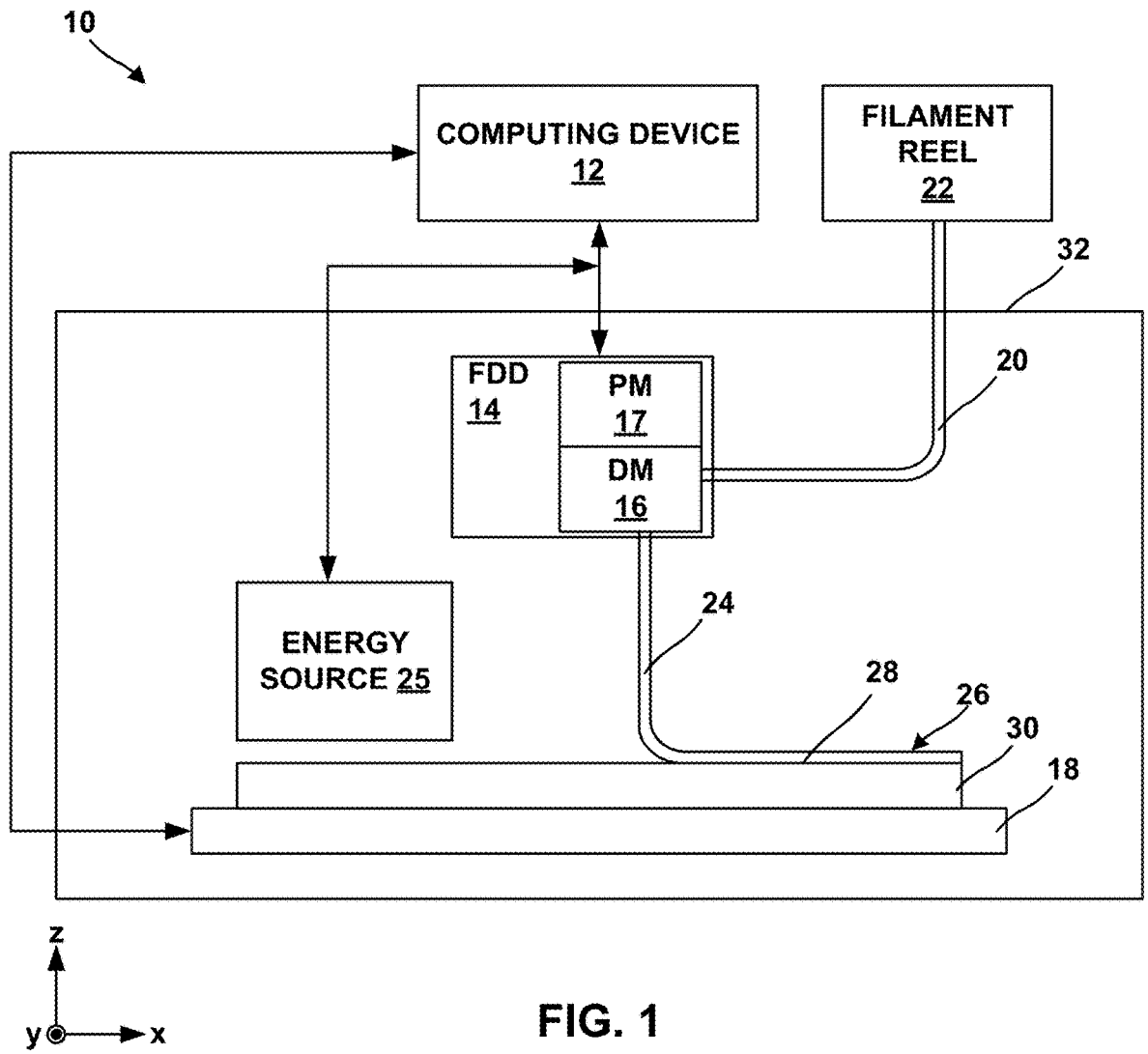
FIG. 1 is a conceptual block diagram illustrating an example system for forming an additively manufactured component, such as a heat pipe, by fused filament fabrication of a material including a metal or alloy powder and a binder.

The disclosure generally describes techniques for forming additively manufactured heat pipes using fused filament fabrication (FFF). A heat pipe may be a highly efficient, solid-state, passive heat transfer device, e.g., for heating or cooling of components, that relies on evaporative cooling and fluid convective flow within an enclosed unit. In some examples, a heat pipe is a heat-transfer device that combines the principles of both thermal conductivity and phase transition to effectively transfer heat between two regions. At a "hot" region of the heat pipe, a working fluid in a liquid phase is a vaporized by absorbing heat from the hot region. The vapor then travels along the heat pipe to a "cold" region, where the vapor condenses back into a liquid phase, thereby releasing latent heat. The liquid phase may then return to the hot region, e.g., by being wicked through a wicking region, and the cycle repeats. In some examples, due to relatively high heat of vaporization for a working fluid, a relatively small volume of working fluid may absorb and release large amounts of heat during the operation of a heat pipe so that the heat pipes may be highly effective heat transfer device. In some examples, a benefit of the heat pipe may be that it allows use of phase change working media without any moving parts (like a pump), so the heat pipe is simple, reliable, and doesn't require any energy/work to operate.

In some examples, a heat pipe may include an outer shell containing a working fluid, a wicking portion, and a vapor transport portion. A vapor travels via the vapor transport portion to a cooler region of the heat pipe, where the vapor condenses to a liquid phase. The liquid phase is wicked through a wicking portion of the heat pipe back to a hotter region of the heat pipe, where the working fluid again vaporizes and travels back to the cooler region of the heat pipe via the vapor transport portion.

Additive manufacturing of metal or alloy components, such as heat pipes, may present unique challenges, for example, compared to additive manufacturing of polymeric components. For example, while techniques such as powder bed fusion (including direct metal laser sintering, electron beam melting, selective laser sintering, or the like), which use a directed energy beam to fuse and sinter material, may be useful in additive manufacturing, some alloys may respond to energy beams in a manner that may not be conducive to localized melting or localized sintering. Further, powder bed fusion may leave residual unfused or unsintered powder, for example, within channels or hollow internal passages of an additively manufactured component. Leaving powder within a heat pipe may result in the heat pipe not working or not working as well, as the vapor transport portion and/or the wicking portion may become plugged with the powder. Powder bed fusion of high temperature alloys may also result in components that may be prone to cracking due to localized melting and thermal gradients.

In some examples, a material including a sacrificial binder and a powder including metal and/or alloy dispersed in the binder may be deposited using fused filament fabrication to form an additively manufactured component. After additively forming one or more layers of the component, or after forming the entire component, the sacrificial binder may be selectively removed or sacrificed from the layers or the component, for example, using heating, chemical dissolution, or the like. Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys may be used, residual (free) powder may be reduced, and crack propensity may be reduced due to the absence of melting. Further, microstructure (such as porosity of the wicking portion) of the additively manufactured component may be more carefully controlled by controlling microstructure of the powder and avoiding melting of the powder during processing.

As described herein, in some examples, a heat pipe device may be formed using a fused filament fabrication process. For example, a filament including a binder and metal and/or alloy powder may be deposited to form a heat pipe preform. The binder may be removed from the preform and the preform may be sintered. The resulting sintered article may define a heat pipe including an outer shell containing a wicking region and vapor transport region within a volume enclosed by the outer shell. A working fluid may be deposited within the outer shell, e.g., after the deposition of the filament, removal of the binder, and/or after sintering. Unlike that of selective laser melting (SLM) process, examples of the disclosure may allow for a near net shape heat pipe preform to be formed by a FFF process, e.g., without having to remove powder from internal cavities like in the case of a SLM process.

A heat pipe may include an outer shell, wicking region, and vapor transport region. Each of these components may be printed as a single assembly using a FFF process for depositing, e.g., a metal impregnated filament, and may even be printed in situ as a subassembly to a larger component. Potential applications for a component with integrated heat pipe cooling may include a cold block for casting or laser blown powder to increase heat flow through the fixtures to promote directional solidification or single crystallinity; integrally cooled tooling to maximize cooling during subtractive machining operations; heated build plate or tooling to preheat components during additive manufacturing; and integrated heat exchanger in engine components to replace open and closed loop heat exchangers. In some examples, a heat pipe in accordance with the disclosure may be used to cool bearings in an engine. In some examples, heat pipes of the disclosure may be employed as heat transfer devices in nuclear reactor applications, space applications (e.g., space vehicles and other systems that operate in an outer space environment), and hypersonic applications (e.g., for cooling hypersonic vehicles).

In some examples, a FFF process may be employed to define regions of the preform that may have different properties once sintered, e.g., by varying the composition and/or other properties of the deposited filament. For example, in the region of the heat tube preform that defines the outer shell of the heat tube after sintering, a filament may be deposited that results in a substantially non-porous region (or region of relatively low porosity) once the binder is removed and the preform is sintered. Conversely, in the region of that heat tube preform that defines the wicking region of the heat tube after sintering, a filament may be deposited that results in a region that promotes or otherwise facilitates transfer of a fluid within the heat tube, e.g., via capillary forces, once the binder is removed and the preform is sintered. Example techniques for tailoring the properties of the outer shell, wicking region, and/or other regions of the heat tube, e.g., using FFF deposition, are described further below.

In some examples, the wicking region of the heat pipe may be printed using a FFF process to define a deliberate network of porosity to encourage the wicking and evaporation of the working fluid. In some examples, dissimilar materials may be used for the heat pipe depending on the heat transfer, corrosion resistance, and strength requirement of the application. Examples of the application for dissimilar materials may include printing, using a FFF process, the wicking region and inner wall of the outer shell to resist corrosion from the selected working fluid; printing, using a FFF process, the outer shell in a different material to resist corrosion of external environment or to increase heat transfer; and/or printing, using a FFF process, the wicking region using dissimilar materials in a gradient to withstand different conditions in the hot and cold end and/or to promote fluid transfer between hot and cold ends.

As used herein, a "heat pipe preform" may refer to an article that has been formed by deposition of a filament using a FFF process, but before the article has been sintered. The heat pipe preform itself may not function as a heat pipe prior to being sintered but may define a heat pipe following the sintering of the heat pipe preform (in addition to additional processing steps following sintering in some instances).

FIG. 1 is a conceptual block diagram illustrating an example fused filament fabrication system 10 for performing fused filament fabrication to form an additively manufactured heat tube preform including a powder and a binder by filament delivery. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the metal or alloy powder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a metal or alloy powder and a binder configured to bind the metal or alloy powder in filament 20.

The metal or alloy powder may include any suitable metal or alloy for forming an additively manufactured component. In some examples, the metal or alloy powder include a high-performance metal or alloy for forming component used in mechanical systems, such as a steel (e.g., stainless steel), a nickel-based alloy, a cobalt-based alloy, a titanium-based alloy, or the like. In some examples, the metal or alloy powder may include one or more refractory metals or alloys. The refractory metals may include, e.g., Ti, V, Cr, Mn, Zr, Nb, Mo, Tc, Ru, Rh, Hf, Ta, W, Re, Os, and Ir. In some examples, the refractory metals may include Nb, Mo, Ta, W, and Re. In some examples, the powder may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy powder may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wis. In some examples, the powder may include cemented carbides, which may be used, e.g., for wear resistance in addition to heat transfer properties.

In some examples, in addition to a metal or alloy powder, the powder may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy. In some examples, ODS alloys may be characterized by the dispersion of fine oxide particles and by an elongated grain shape, which may enhance high temperature deformation behavior by inhibiting intergranular damage accumulation.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal or alloy powder may be dispersed in the sacrificial binder, for example substantially uniformly dispersed in the sacrificial binder. In some examples, the binder may also encase the powder, e.g., like a straw contains sugar.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in roads 26 to form a material including the metal or alloy powder dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form roads 26 including the material that includes the metal or alloy powder and the sacrificial binder. In other examples, the heat to which the composition is exposed to form softened filaments 24 may initiate the curing reaction, and no additional energy source is used.

Filament 20 includes a selected amount of sacrificial binder and metal or alloy powder so that the material in roads 26 may include more than about 80% by volume of the metal or alloy powder, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder.

In some examples, filament 20 includes at least one shrink-resistant agent. For example, the at least one shrink-resistant agent may include a ceramic, instead of, or in addition to, the oxide in any ODS present in the material(s).

Figure 2:
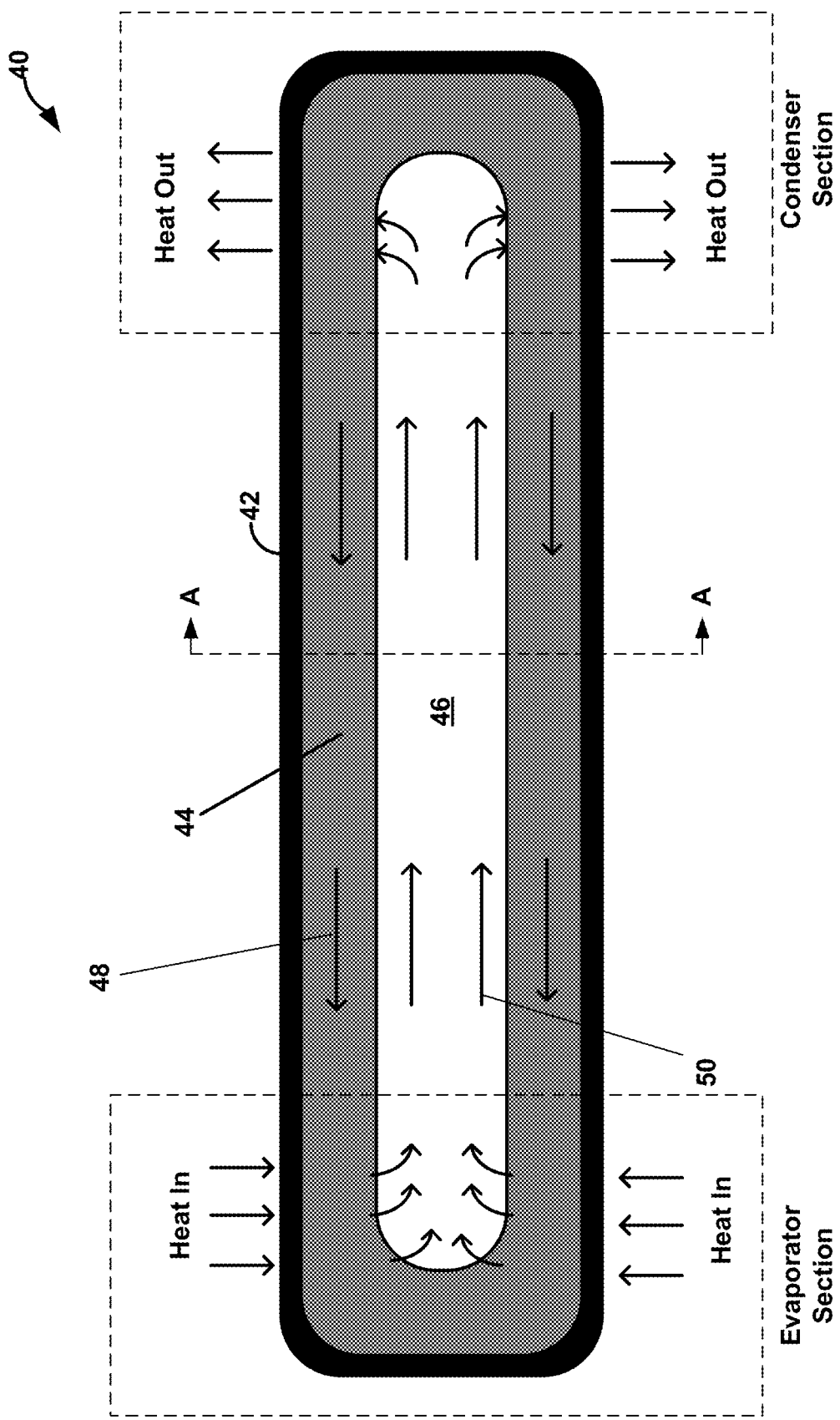
FIG. 2 is a schematic diagram illustrating an example heat pipe in accordance with examples of the disclosure.
Figure 3:
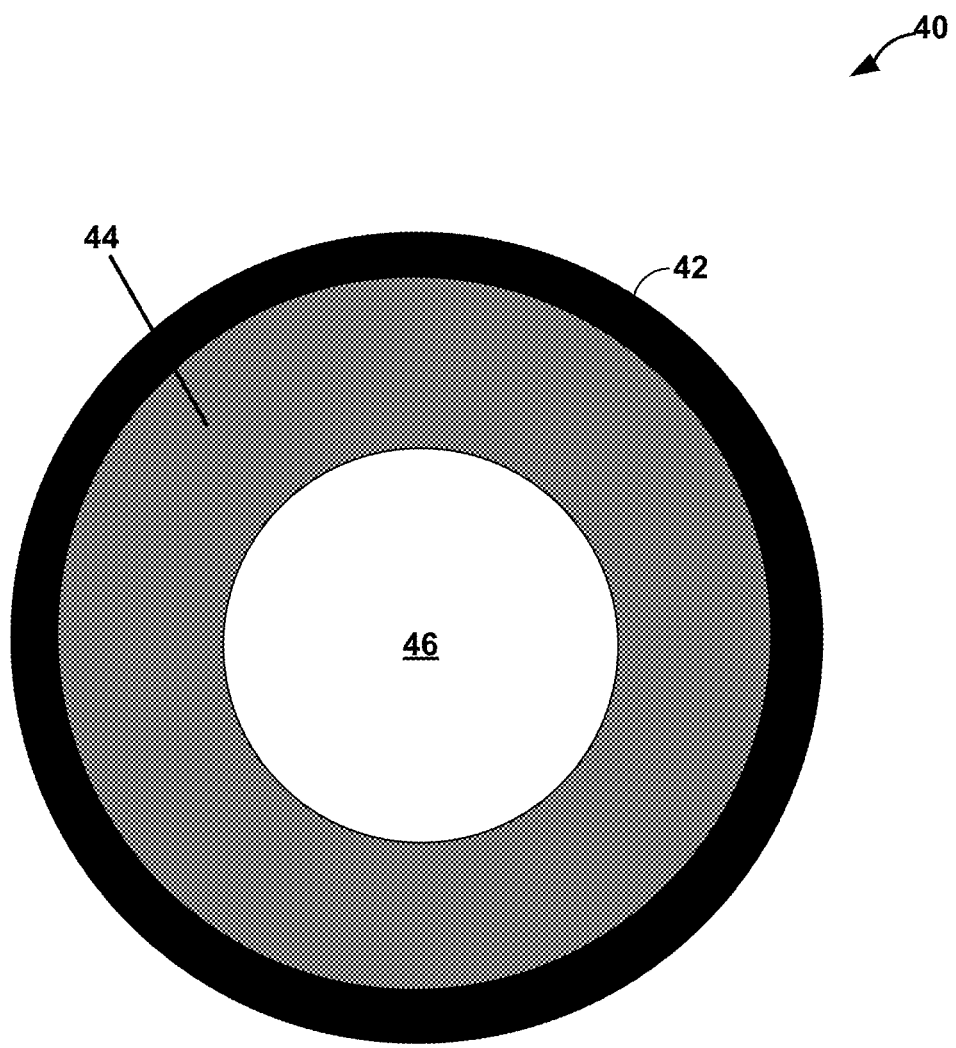
FIG. 3 is a schematic diagram illustrating an alternative example cross-sectional view of the heat pipe of FIG. 2.

FIG. 2 is conceptual schematic diagram illustrating an example heat pipe 40 that may be formed using FFF. Heat tube 40 includes outer shell 42, which encloses wicking region 44 and vapor transport region 46 of heat pipe 40. FIG. 3 is a conceptual schematic diagram illustrating an example of heat pipe 40 of FIG. 2 along cross-section A-A. Although not directly shown in FIGS. 2 and 3, outer shell 42 of heat pipe 40 also encloses a working fluid. As described herein, heat pipe 40 may be formed using an FFF process to form a preform which may then be processed to remove the binder from the preform and sinter the preform to form heat pipe 40 in the form shown in FIG. 2.

As will be described below, in some examples, system 10 may be employed to form heat pipe 40 via a FFF process.

For example, computing device 12 may control filament deposition device 14 to deposited filament 24 to form a heat pipe preform from filament 24. Filament 24 may have any suitable composition such as those described herein. The sacrificial binder in the filament may be removed and the heat pipe preform may be sintered to result in heat pipe 40 having outer shell 42, wicking region 44 and vapor transport region 46.

As shown in FIG. 2, when being used as a heat transfer device, heat pipe 40 may define an evaporator section (also referred to as a "hot" section or region of heat pipe 40) where heat is conducted or otherwise transferred into heat pipe 40 from the external environment. The heat vaporizes working fluid that is in liquid phase within outer shell 42 of heat pipe 40, e.g., in wicking region 44 in the evaporator section. The working fluid in the gas phase flows through vapor transport region 46 (e.g., as indicated by arrows 50) to the condenser section of heat pipe 40 (also referred to as a "cold" section or region of heat pipe 40). The vapor transport region 46 may be an open lumen in heat pipe 40 that allows for the flow of the working fluid vapor. In the condenser section, heat is conducted or otherwise transferred out of heat pipe 40 to the external environment. The gas phase working fluid condenses to a liquid phase in the condenser section and is transported in the liquid phase back to towards the evaporator section via wicking region 44, e.g., as indicated by arrows 48. The cycle repeats in this manner to transfer heat between the "hot" region of heat pipe 40 to the "cold" region of heat pipe 40.

Any suitable working fluid may be employed in heat pipe 40. The selection of the working fluid may depend on the operating temperature range for the desired application. For example, a working fluid may be selected that evaporates at the temperature of the "hot" region of heat pipe 40 during operation and that condenses at the temperature of the "cold region." Addition, the working fluid may be selected to be compatible (e.g., chemically) with the materials of outer shell 42 and/or wicking region 44. In some examples, the working fluid may be helium, hydrogen, neon, oxygen, nitrogen, methane, ethane, propylene, pentane, methylamine, methanol, another alcohol, ammonia, carbon dioxide, acetone, water, cesium, potassium, sodium potassium, sodium, lithium, or silver, although other working fluids are contemplated.

Outer shell 42 of heat pipe 40 may define a substantially non-porous or relatively low porosity region of heat pipe 40. The porosity of outer shell 42 may be selected such that outer shell 42 defines a barrier, e.g., a hermetic barrier, to contain the working fluid within outer shell 42. In some examples, outer shell 42 may define a substantially hermetic barrier around wicking region 44 and vapor transport region 46 (as well as the working fluid contained within outer shell 42) such that the working fluid, in both liquid and vapor form, is contained within outer shell 42. In some examples, outer shell 42 may have a porosity of less than approximately 5%, such as, less than 2% or 1% or less. In some examples, outer shell 42 may have a relatively high thermal conductivity to conduct heat to and from the external environment. Outer shell 42 may be configured to substantially contain the working fluid within outer shell 42 in both the liquid and gas phase.

In some examples, outer shell 42 may be integral with a larger component, e.g., with an engine block, casing, or other component that is being cooled. Composition of outer shell may be compatible with the adjacent component being cooled, e.g., the coefficient of thermal expansion may be relatively close such that size of outer shell changes approximately the same amount as surrounding component.

Outer shell 42 may have any suitable composition. The composition of outer shell 42 may be determined based, at least in part, on the powder used for the filament deposited by a FFF process when forming the section of the pre-sintered heat pipe corresponding to outer shell 42 of heat pipe 40. In some examples, outer shell 42 may comprise, consist, or consist essentially of one or more of the powder materials described herein. In some examples, wicking region 44 may comprise, consist, or consist essentially of one or more refractory metals.

In some examples, the composition of outer shell may be selected based on the working fluid employed in heat pipe 40. For example, the composition of all or a portion of outer shell 42, e.g., the inner portion of outer shell 42, may be selected to resist corrosion from the working fluid.

In some examples, all or a portion of outer shell 42, e.g., the outer portion of outer shell 42, may have a composition that resists corrosion from the external environment and/or increase heat transfer to and from the external environment into heat pipe 40 across outer shell 42.

Wicking region 44 may be contained within outer shell 42 and may be configured to wick the working fluid in the liquid phase from the "cold" region to the "hot" region in the manner described herein. In some examples, wicking may refer to the transport of a liquid through a medium via capillary action. Like that of outer shell 42, wicking region 44 may be formed via a FFF process. For example, a filament deposition device may deposit one or more filaments (e.g., filament(s) with a metal or alloy powder and a binder) to form a pre-sintered preform having a region that corresponds to wicking region 44 after the preform has been sintered. As such, wicking region 44 may include a sintered metal or alloy.

In some examples, wicking region 44 includes a plurality of grooves or channels formed by the FFF process through which the liquid may wick as described. In some examples, the surface texture of wicking region 44 may facilitate the wicking of the working liquid through the grooves and/or channels of wicking region 44. Additionally, or alternatively, in some examples, the liquid phase the working fluid may wick through the porosity of wicking region 44, e.g., when wicking region is a substantially continuous layer of sintered metal or alloy powder. In some examples, wicking region 44 may be formed by deposition of one or more filaments, such as filament 24, in an intertwined, entangled, and/or disordered fashion that is subsequently sintered with the binder removed to form "rat's nest" of sintered metal or alloy for wicking region 44, where the working fluid wicks or otherwise transports within heat pipe 40 as described herein.

Wicking region 44 may have any suitable composition. The composition of wicking region 44 may be determined based, at least in part, on the powder used for the filament deposited by a FFF process when forming the section of the pre-sintered heat pipe corresponding to wicking region 44 of heat pipe 40. In some examples, wicking region 44 may comprise, consist, or consist essentially of one or more of the metal or alloy powders described herein. In some examples, wicking region 44 may comprise, consist, or consist essentially of copper. In some examples, wicking region 44 may comprise, consist, or consist essentially of one or more refractory metals.

In some examples, wicking region 44 may be formed to have a gradient from the "hot" end to the "cold" end of heat pipe 40. For example, wicking region 44 may be printed using dissimilar materials in a gradient between the "hot"

end and "cold" end, e.g., to withstand different conditions in the "hot" end and "cold" end, and/or to promote fluid transfer between the "hot" end and "cold" end.

In some examples, wicking region 44 is a substantially continuous layer of material, e.g., directly adjacent to outer shell 42. Wicking region 44 has a porosity that causes the liquid phase of the working fluid to wick in the manner described herein, e.g., along the path indicated by arrows 48. The particular porosity of wicking region 44 may depend on the working fluid employed by heat pipe 40.

In some examples, wicking region 44 may be formed to have a porosity gradient. For example, the porosity of wicking region 44 may vary moving between the "hot" end and "cold" end of heat pipe 40. In one example, the porosity of wicking region 44 at or near the "cold" end of heat pipe 40 may have a porosity that is greater than the porosity of wicking region 44 at or near the "hot" end of heat pipe 40. In another example, the porosity of wicking region 44 at or near the "cold" end of heat pipe 40 may have a porosity that is less than the porosity of wicking region 44 at or near the "hot" end of heat pipe 40.

Wicking region 44 may have properties different from that of outer shell 42 (e.g., based on the different function of wicking section 44 compared to outer shell 42 for the operation of heat pipe 40 as a heat transfer device). In some examples, wicking section 44 may have a different material composition than outer shell 42 while in other examples, the material composition may be substantially the same while one or more other properties are different to allow for different functionality between outer shell 42 and wicking section 44. In some examples, outer shell 42 and wicking region 44 may have different porosities (e.g., with outer shell 42 having a lower porosity than wicking region 44).

Vapor transport region 46 may be an open lumen within outer shell 42 that extends between the "hot" region and the "cold" region of heat pipe 40. Vapor transport region 46 may be defined by the negative or empty space outside the boundaries of wicking region 44 with outer shell 42. The dimension of vapor transport region 46 may allow for sufficient flow of the working fluid in vapor form between the "hot" region and the "cold" region of heat pipe 40.

Figure 4:
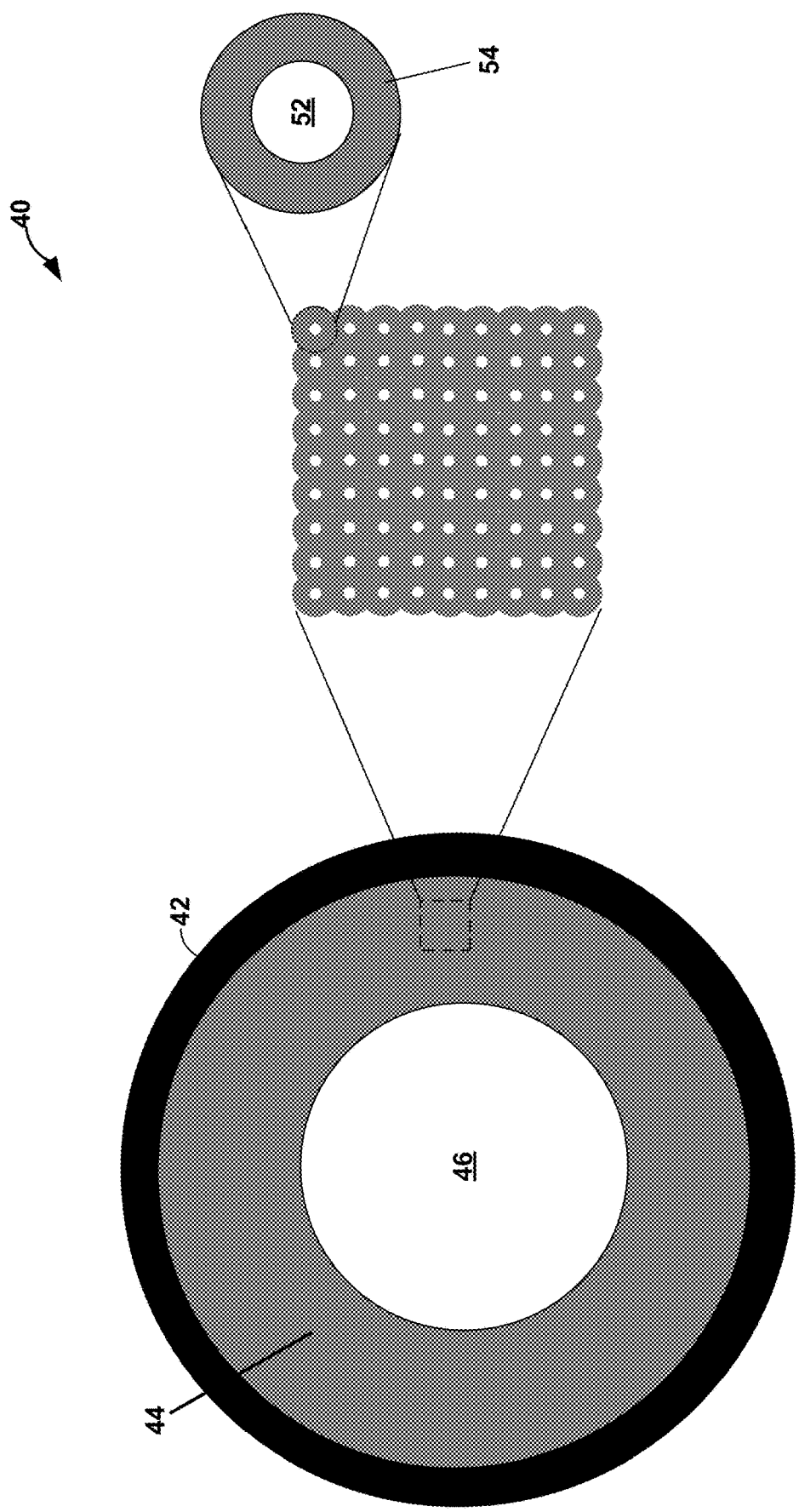
FIG. 4 is a schematic diagram illustrating an alternative example cross-sectional view of the heat pipe of FIG. 2.

FIG. 4 is a schematic diagram illustrating another example cross-section of heat pipe 40 of FIG. 2 along cross-section A-A. The example of FIG. 4 may be an alternative to the example of FIG. 3, or may employed in conjunction with the examples of FIG. 3. For example, in the example of FIG. 3, heat pipe 40 may have a substantially continuous layer defining wicking region 44, where the porosity of the material of wicking region 44 promotes fluid flow from the "cold" end to the "hot" end of heat pipe 40. In the example of FIG. 4, wicking region 44 may define a plurality of open lumens, such as, open lumen 44. Open lumen 44 may extend, e.g., substantially continuously, between the "hot" region and "cold" region of heat pipe 40 and may define an open pathways for which the liquid phase of the working fluid in outer shell 42 to wick during operation of heat pipe 40 as a heat transfer device as described herein.

Open lumen 52 may be defined by sintered powder 54. Sintered portion 54 may be formed by removing the binder from a deposited filament, such as, filament 24, and sintering the metal or alloy powder of the filament. In some examples, open lumen 44 may be formed by the removal of the binder from filament 24. For example, prior to removal of the binder, the filament may have a cross-section similar to that shown in FIG. 4 for sintered portion 54 but with binder in place of the open lumen 44. Once the binder is removed from the deposited filament 24 and the metal or alloy powder is sintered, only the sintered portion 54 may remain, e.g., in the form of a hollow tube like that shown in FIG. 4. Put another way, each individual open lumen 52 surrounded by sintered portion 54 of wicking portion 44 may correspond to a filament deposited during an FFF process, e.g., along a pathway from the "hot" section to the "cold" section, with the binder in place of the open lumen 52. The binder of the filament may be removed or sacrificed, and the powder sintered to define the individual lumen 52 surrounded by sintered portion 54, as shown in FIG. 4.

Lumen 52 may have any suitable diameter or greatest outer dimension. While the cross-section of the sintered portion 54 and open lumen 52 is illustrated as circular in FIG. 4, other cross-sections are contemplated. Further, the cross-sectional shape of sintered portion 54 may be the same or different from the cross-sectional shape of open lumen 52.

While open lumen 52 may be formed by depositing a filament with binder concentrated in the "middle" of the filament rather than being evenly dispersed with the powder in the example of FIG. 4, in other example, similar structures may be formed using a FFF process in which a filament is used with the binder evenly dispersed with the powder in the filament. For example, the deposition of the filament may be controlled to define open channel 46 with the filament being deposited in the area of sintered powder 54, the area of sintered powder 54 is formed by a plurality of filaments deposited on and/or adjacent to each other during the FFF deposition process.

Figure 5:
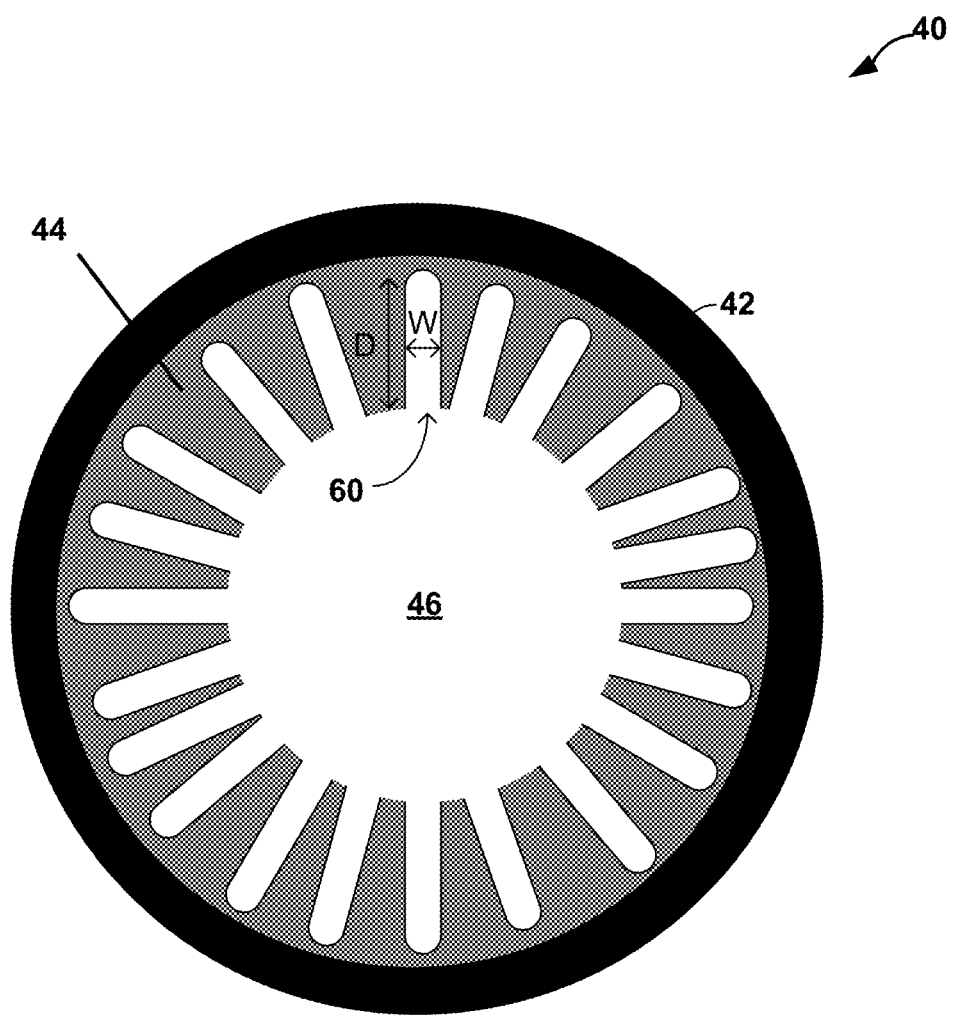
FIG. 5 is a schematic diagram illustrating an alternative example cross-sectional view of the heat pipe of FIG. 2.

FIG. 5 is a schematic diagram illustrating another example cross-section of heat pipe 40 of FIG. 2 along cross-section A-A. The example of FIG. 4 may be an alternative to the example of FIGS. 3 and 4, or may be employed in conjunction with the examples of FIGS. 3 and 4. In the example of FIG. 5, wicking region 44 includes a plurality of grooves, such as, groove 60, e.g., extending from the inner surface of wicking region 44 towards outer shell 46. Groove 60, individually and/or collectively with the plurality of grooves not labeled in FIG. 5, may facilitate the wicking or other transfer of the working fluid from the "cold" end to the "hot" end of heat pipe 40. Groove 60 may extend substantially continuously from the "cold" end to the "hot" end of heat pipe 40.

Groove 60 may have any suitable dimensions including width W and depth D. In some examples, the depth D and width W of all of the induvial grooves are the same while in other examples, the depth D and width W of all of the induvial grooves are the different. The width and/or depth may vary moving from the "cold" end to the "hot" end of heat pipe 40, or may be substantially constant along the length of heat pipe 40 the "cold" end to the "hot" end.

In some examples, the inner surface of groove 60 may have a surface roughness or other texture that promotes fluid transfer within groove 60 from the "cold" end to the "hot" end of heat pipe 40.

Each of the outer shell 42, wicking region 44, and vapor transport region 46 may be defined using an FFF process to generate a pre-sintered preform, which is subsequently sintered (e.g., during or after binder is removed from the preform) to form heat pipe 40 of FIG. 2.

As described herein, outer shell 42 and wicking region 44 may be formed by a FFF process. A filament including a binder and powder including metal or alloy may be deposited as desired, e.g., using system 10 of FIG. 1, to form a preform. The binder may be sacrificed, and the powder may be sintered to form a heat pipe, such as, e.g., heat pipe 40.

Figure 6:
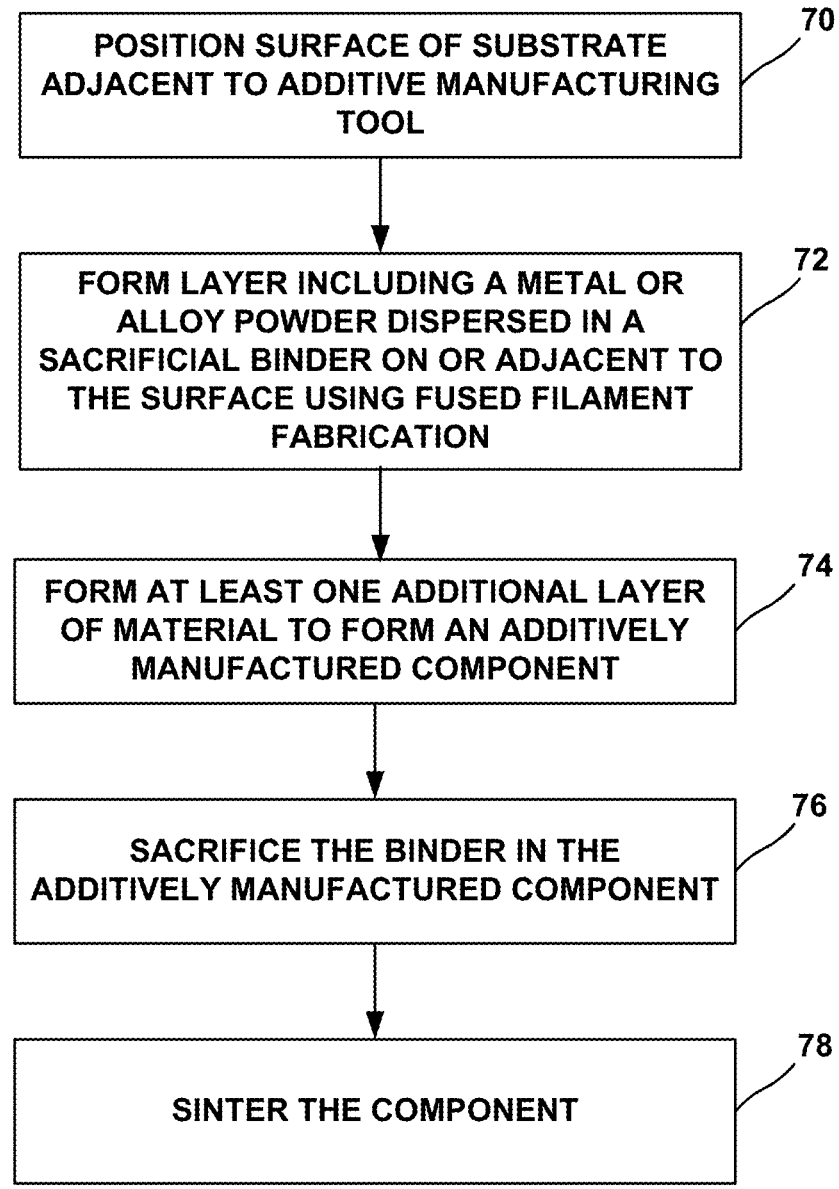
FIG. 6 is a flow diagram illustrating an example technique for forming an additively manufactured component using fused filament fabrication.

An example technique that may be implemented by system 10 will be described with concurrent reference to FIG. 2. FIG. 6 is a flow diagram illustrating an example technique for forming an additively manufactured heat pipe 40 including at least one feature smaller than a base resolution of the additive manufacturing technique. Although the technique of FIG. 6 is described with respect to system 10 of FIG. 1, in other examples, the technique of FIG. 6 may be performed by other systems, such a system including fewer or more components than those illustrated in FIG. 1. Similarly, system 10 may be used to perform other additive manufacturing techniques.

The technique of FIG. 6 includes positioning substrate 30 including surface 28 adjacent to a build position, e.g., on stage 18 (70). In some examples, system 10 may not include a separate substrate 30, the technique of FIG. 6 may include positioning a build surface defined by stage 18, or by another component, or layers of prior softened filament 24 or another material.

The technique of FIG. 6 also includes forming a road 26 of material using fused filament fabrication (72). Computing device 12 may cause filament delivery device 14 to deposit softened filament 24 in one or more roads 26 to ultimately form the additively manufactured component. A plurality of roads 26 defining a common plane may define a layer of material. Thus, successive roads 26 may define a series of layers, for example, parallel layers, and the series of layers may eventually define the additively manufactured component.

The technique of FIG. 6 also includes forming, on roads 26 of material, at least one additional layer of material to form an additively manufactured component (74). For example, computing device 12 may control movement and positioning of filament delivery device 14 relative to stage 18, and vice versa, to control the locations at which roads are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (74). For example, the additively manufactured component may be a pre-sintered preform having regions that, once the binder is removed and the preform is sintered, define outer shell 42, wicking region 44, and vapor transport region 46 of heat pipe 40 in FIG. 2.

The technique of FIG. 6 includes, after forming the additively manufacturing component (74), sacrificing the binder from the component (76). The sacrificing (76) may include delivering thermal or any suitable energy, for example, by energy source 25, to roads 24 in an amount sufficient to cause binder to be substantially oxidized, incinerated, carbonized, charred, decomposed, chemically dissolved, or removed from roads 24, while leaving the metal or alloy powder substantially intact. In other examples, the additively manufactured component may be placed in a furnace to heat the additively manufactured component and cause removal of the binder from the component (76). In some examples, the binder may be "sacrificed" by chemically dissolving the binder to remove the binder while leaving the powder intact.

The technique of FIG. 6 also includes, after sacrificing the binder (76), sintering the component (78). The sintering may include a thermal treatment, for example, one or more predetermined cycles of exposure to predetermined temperatures for predetermined times. In some examples, energy source 25 may deliver energy to cause sintering. In other examples, the additively manufactured component may be placed in a furnace to heat the additively manufactured component and cause sintering. In some examples, the sintering (78) may promote the bonding of particles of powder to each other to strengthen the component including substantially only the powder after the binder is sacrificed. Sintering may not melt the particles of powder, thus leaving the microstructure of the particles substantially intact. This may facilitate forming components with selected microstructures compared to techniques that include melting the powder. The sintering (78) may also densify an interior or a surface region of the component, for example, by promoting powder compaction and reducing porosity. In some examples, the steps of removing the sacrificial binder (76) and sintering the component (78) may be combined in a single heating step or series of heating steps, e.g., within a furnace.

In some examples, the process of FIG. 6 may be employed to form a heat pipe, such as, heat pipe 40. Using the process of FIG. 6, outer shell 42, wicking region 44, and vapor transport region 46 may be formed to have properties such as those described herein. For example, the properties of outer shell 42 and wicking region 44 (e.g., composition, porosity, geometry, and/or the like) may be tailored as describe herein by using such a FFF process.

While heat pipe 40 of FIG. 2 is shown as having a cylindrical shape, other shapes are contemplated. Heat pipe 40 may have a non-linear shape, e.g., where heat pipe 40 curves along its length at one or more points to conform to an open space within an article that is being cooled by heat pipe 40. In some examples, outer shell 42, wicking region 44, and vapor transport region 46 may have a unique shape that fits within void space of a larger component or combination of components in a system. Heat pipe 42 may be formed within the space, e.g., by printing directly in the void space (e.g., onto one or more surface of the component(s) or may heat pipe 40 be prefabricated using a FFF process and then subsequently positioned as desired in the void space. In some examples, the one or more other components may also be formed by an additive manufacturing process. In some examples, the other component(s) (e.g., a component being cooled by heat pipe 40) may be integrally formed with heat pipe 40, e.g., using the same FFF process where the component and heat pipe 40 are sintered at the same time as each other.

Examples of the heat pipes described herein may be used as heat transfer devices in any desired application including those applications described herein. Example applications may include but are not limited to: cooling tooling for subtractive machining operations, heated build plate or tooling to preheat components during additive manufacturing; and integrated heat exchanger in engine components to replace open and closed loop heat exchangers. In some examples, a heat pipe in accordance with the disclosure may be used to cool bearings in an engine. In some examples, heat pipes of the disclosure may be employed as heat transfer devices in nuclear reactor applications, space applications (e.g., space vehicles and other systems that operate in an outer space environment), and hypersonic applications (e.g., for cooling hypersonic vehicles).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following clauses and claims.

Clause 1. A method for additively manufacturing a heat pipe, the method comprising: depositing, via a filament delivery device, a filament to form a heat pipe preform, wherein the filament includes a sacrificial binder and a metal or alloy powder; and sintering the heat pipe preform to form the heat pipe, the heat pipe including an outer shell, a wicking region, and a vapor transport region defined by the metal or alloy.

Clause 2. The method of clause 1, wherein the wicking portion comprises a plurality of open lumens formed by the sintered metal or alloy powder extending from a hot end to a cold end of the heat pipe, and wherein each individual open lumen of the plurality lumens is defined by a cross-section of the deposited filament.

Clause 3. The method of clause 1 or 2, wherein a composition of the wicking region varies from a cold end to a hot end of the heat pipe.

Clause 4. The method of any one of clauses 1-3, wherein a porosity of the wicking region varies from a cold end to a hot end of the heat pipe.

Clause 5. The method of any one of clauses 1-4, wherein wicking region define a plurality of grooves extending from a cold end to a hot end of the heat pipe.

Clause 6. The method of any one of clauses 1-5, wherein the wicking portion and outer shell define different porosities.

Clause 7. The method of any one of clauses 1-6, wherein the wicking portion and outer shell have different compositions.

Clause 8. The method of any one of clauses 1-7, wherein an inner surface of the outer shell has a different composition than that of an outer surface of the outer shell.

Clause 9. The method of any one of clauses 1-8, further comprising depositing a working fluid within the outer shell.

Clause 10. The method of any one of clauses 1-9, wherein the wicking portion defines a porosity greater than a porosity of the outer shell.

Clause 11. The method of any one of clauses 1-10, wherein the heat pipe is integrally formed with another component, wherein the other component is formed by depositing, via the filament delivery device, the filament to form a preform for the other component.

Clause 12. An additively manufactured heat pipe comprising an outer shell, a wicking region, and a vapor transport region defined by a metal or alloy derived from fused filament fabrication process.

Clause 13. The heat pipe of clause 12, wherein the wicking portion comprises a plurality of open lumens formed by the sintered metal or alloy powder extending from a hot end to a cold end of the heat pipe, and wherein each individual open lumen of the plurality lumens is defined by a cross-section of the deposited filament.

Clause 14. The heat pipe of clause 12 or 13, wherein a composition of the wicking region varies from a cold end to a hot end of the heat pipe.

Clause 15. The heat pipe of any one of clauses 12-14, wherein a porosity of the wicking region varies from a cold end to a hot end of the heat pipe.

Clause 16. The heat pipe of any one of clauses 12-15, wherein wicking region define a plurality of grooves extending from a cold end to a hot end of the heat pipe.

Clause 17. The heat pipe of any one of clauses 12-16, wherein the wicking portion and outer shell define different porosities.

Clause 18. The heat pipe of any one of clauses 12-17, wherein the wicking portion and outer shell have different compositions.

Clause 19. The heat pipe of any one of clauses 12-18, wherein an inner surface of the outer shell has a different composition than that of an outer surface of the outer shell.

Clause 20. The heat pipe of any one of clauses 12-19, further comprising a working fluid within the outer shell.

Clause 21. The heat pipe of any one of clauses 12-20, wherein the wicking portion defines a porosity greater than a porosity of the outer shell.

Clause 22. The heat pipe of any one of clauses 12-21, wherein the heat pipe is integrally formed with another component, wherein the other component is formed by depositing, via the filament delivery device, the filament to form a preform for the other component.

Clause 23. An additive manufacturing system comprising: a substrate defining a major surface; a filament delivery device; and a computing device configured to control a filament delivery device to deposit a filament to form a pre-sintered heat pipe preform, wherein the filament includes a binder and a metal or alloy powder, and wherein the pre-sintered heat pipe preform is configured to be sintered to form the heat pipe, the heat pipe including an outer shell, a wicking region, and a vapor transport region defined by the metal or alloy.

Clause 24. The system of clause 23, wherein the wicking portion comprises a plurality of open lumens formed by the sintered metal or alloy powder extending from a hot end to a cold end of the heat pipe, and wherein each individual open lumen of the plurality lumens is defined by a cross-section of the deposited filament.

Clause 25. The system of clause 23 or 24, wherein a composition of the wicking region varies from a cold end to a hot end of the heat pipe.

Clause 26. The system of any one of clauses 23-25, wherein a porosity of the wicking region varies from a cold end to a hot end of the heat pipe.

Clause 27. The system of any one of clauses 23-26, wherein wicking region define a plurality of grooves extending from a cold end to a hot end of the heat pipe.

Clause 28. The system of any one of clauses 23-27, wherein the wicking portion and outer shell define different porosities.

Clause 29. The system of any one of clauses 23-28, wherein the wicking portion and outer shell have different compositions.

Clause 30. The system of any one of clauses 23-29, wherein an inner surface of the outer shell has a different composition than that of an outer surface of the outer shell.

Clause 31. The system of any one of clauses 23-30, wherein the system is configured to deposit a working fluid within the outer shell.

Clause 32. The system of any one of clauses 23-31, wherein the wicking portion defines a porosity greater than a porosity of the outer shell.

Clause 33. The system of any one of clauses 23-32, wherein the heat pipe is integrally formed with another component, wherein the other component is formed by depositing, via the filament delivery device, the filament to form a preform for the other component.

What is claimed is:

1. A method for additively manufacturing a heat pipe, the method comprising:
   depositing, via a filament delivery device, a filament to form a heat pipe preform, wherein the filament includes a sacrificial binder and a metal or alloy powder; and
   sintering the heat pipe preform to form the heat pipe, the heat pipe including an outer shell, a wicking region, and a vapor transport region defined by the metal or alloy, and
   wherein the heat pipe is integrally formed with another component, wherein the other component is formed by depositing, via the filament delivery device, the filament to form a preform for the other component.

2. The method of claim 1, wherein the wicking region comprises a plurality of open lumens formed by the sintered metal or alloy powder extending from a hot end to a cold end of the heat pipe, and wherein each individual open lumen of the plurality lumens is defined by a cross-section of the deposited filament.

3. The method of claim 1, wherein a composition of the wicking region varies from a cold end to a hot end of the heat pipe.

4. The method of claim 1, wherein a porosity of the wicking region varies from a cold end to a hot end of the heat pipe.

5. The method of claim 1, wherein wicking region define a plurality of grooves extending from a cold end to a hot end of the heat pipe.

6. The method of claim 1, wherein the wicking region and outer shell define different porosities.

7. The method of claim 1, wherein the wicking region and outer shell have different compositions.

8. The method of claim 1, wherein an inner surface of the outer shell has a different composition than that of an outer surface of the outer shell.

9. The method of claim 1, further comprising depositing a working fluid within the outer shell.

10. The method of claim 1, wherein the wicking region defines a porosity greater than a porosity of the outer shell.

* * * * *